United States Patent [19]

Ito et al.

[11] Patent Number: 4,906,918

[45] Date of Patent: Mar. 6, 1990

[54] TEMPERATURE DETECTOR HAVING A PYROELECTRIC DEVICE AND IMPEDANCE CONVERSION

[75] Inventors: Nobuhiro Ito; Michihiro Murata; Satoru Ito, all of Kyoto, Japan

[73] Assignee: Murata Manufacturing Co., Ltd., Japan

[21] Appl. No.: 249,974

[22] Filed: Sep. 27, 1988

[30] Foreign Application Priority Data

Sep. 28, 1987 [JP] Japan ................................ 62-148510

[51] Int. Cl.⁴ .......................... G01R 27/00; G01J 5/02
[52] U.S. Cl. ................................. 324/715; 250/338.3; 374/183
[58] Field of Search ........................ 324/65 P, 65 R; 250/338.3, 338.1; 374/172, 183, 185

[56] References Cited

U.S. PATENT DOCUMENTS 3,846,820 11/1974 Lampe et al. ............... 250/338.3 X
4,110,616 8/1978 Porter et al. ................. 250/338.3
4,293,768 10/1981 Adachi et al. ............... 250/338.3
4,445,034 4/1984 Tomita et al. ............... 250/338.3
4,740,700 4/1988 Shaham et al. ........... 250/338.3 X Primary Examiner—Reinhard J. Eisenzopf
Assistant Examiner—Jack B. Harvey
Attorney, Agent, or Firm—Ostrolenk, Faber, Gerb & Soffen

[57] ABSTRACT

A temperature detector comprises a pyroelectric device (10) having electrodes (11, 12) on both main surfaces, with an insulating film (13) formed on one of the main surfaces. An impedance converting circuit formed of a field effect transistor (20) and resistance elements (18, 19) is electrically and physically connected between an electrode (11) exposed through a hole (14) formed in the insulating film and electrodes (15, 16, 17) formed on the insulating film. The detector is entirely covered by molded resin (24). Consequently, problems of disconnection and short circuit of leads between the pyroelectric device and the impedance converting circuit can be eliminated.

8 Claims, 3 Drawing Sheets

TEMPERATURE DETECTOR HAVING A PYROELECTRIC DEVICE AND IMPEDANCE CONVERSION

BACKGROUND OF THE INVENTION

1. Field of the Invention

The present invention relates to a temperature detector utilizing a pyroelectric effect. More specifically, the present invention relates to a temperature detector which detects and outputs the change of temperature of an object, such as a secondary cell while it is being charged with the temperature changing as time passes, as electric signals.

2. Description of the Prior Art

A temperature detector employing a pyroelectric device for detecting the temperature rise of a battery cell at the completion of charging is used to detect the completion of charging of a secondary cell such as a Ni-Cd battery. In such a conventional temperature detector, shown in FIG. 8, a pyroelectric device 1 serving as a detecting element, and an impedance converting circuit 2 serving as a detecting circuit, are separately formed and they are electrically connected by a lead 3.

In the said conventional temperature detector, the pyroelectric device 1 serving as the detecting element is a bare thin plate, and therefore it is weak and easily damaged by a physical shock. There is a possibility of disconnection or short circuit of the lead connecting the detecting element and the detecting circuit. Measures for preventing damage due to moisture must be separately provided for the detecting element and the detecting circuit, thereby rendering the manufacturing process complicated. In addition, since the detecting element and the detecting circuit are independent from each other, the temperature detector as a whole can not be made compact.

SUMMARY OF THE INVENTION

Therefore, an object of the present invention is to provide a temperature detector free from the risks of disconnection and short circuit, and which can be easily made compact.

Briefly stated, in the present invention, a pyroelectric device having electrodes on both main surfaces is provided, an insulating film is formed at least on one electrode, an impedance converting circuit is formed on the insulating film, and the impedance converting circuit is connected to the electrode.

Therefore, according to the present invention, the pyroelectric device and the impedance converting circuit are integrally arranged adjacent to each other, whereby the problem of disconnection or short circuit of the lead between the pyroelectric device and the impedance converting circuit can be eliminated. In addition, since the pyroelectric device and the impedance converting circuit are formed integrally, the whole apparatus can be made compact.

In a preferred embodiment, the pyroelectric device, the insulating film and the impedance converting circuit are covered by a resin coating. Since the whole apparatus is covered by the resin coating, the effect of preventing damage due to moisture can be enhanced.

In a more preferred embodiment, the impedance converting circuit comprises a circuit pattern formed on the insulating film and an impedance converting device chip connected to the circuit pattern.

The foregoing and other objects, features, aspects and advantages of the present invention will become more apparent from the following detailed description of embodiments of the present invention when taken in conjunction with the accompanying drawings.

DESCRIPTION OF THE PREFERRED EMBODIMENTS

Figure 1:
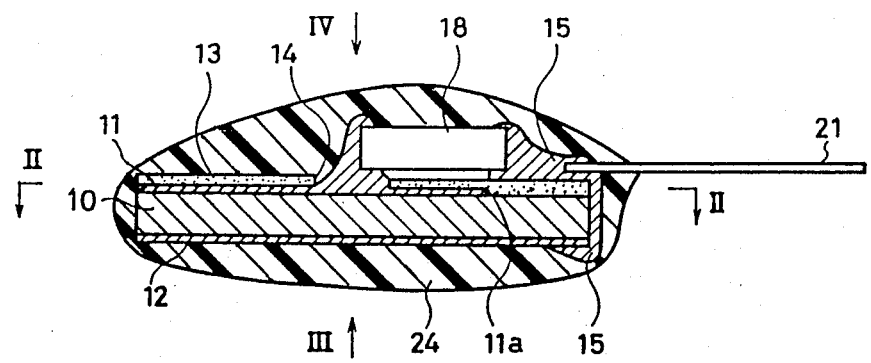
FIG. 1 is a vertical sectional view of one embodiment of the present invention.
Figure 2:
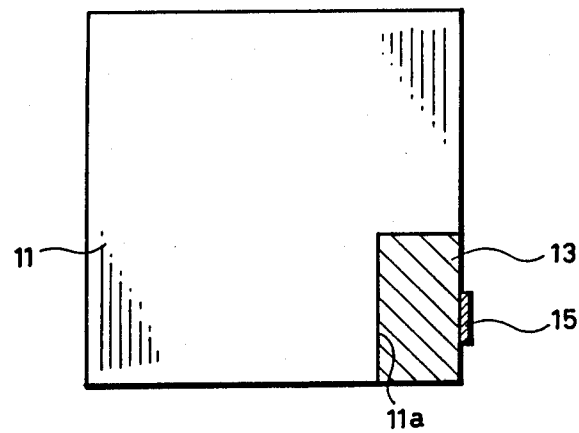
FIG. 2 is a cross sectional view taken along the line II—II of FIG. 1, with the mold resin removed for convenience.
Figure 3:
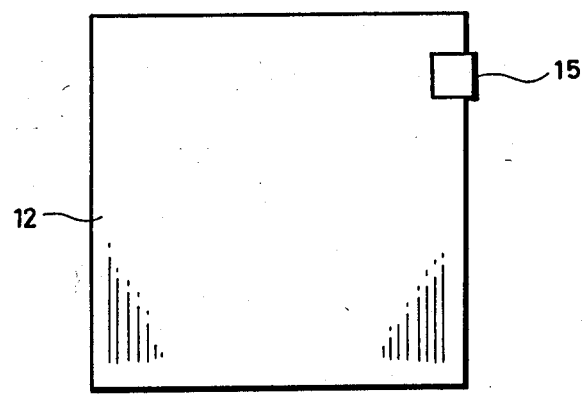
FIG. 3 is a plan view from the direction of the arrow III of FIG. 1, with the mold resin removed.

Referring to FIG. 1, electrodes 11 and 12 are respectively formed on upper and lower main surfaces of a flat rectangular pyroelectric device 10. The upper electrode 11 is formed almost entirely over the main surface of the pyroelectric device 10 as shown in FIG. 2, with a notched portion 11a provided at a lower corner in the right of FIG. 2. The lower electrode 12 is formed on the entire lower main surface of the pyroelectric device 10, as shown in FIG. 3.

Figure 4:
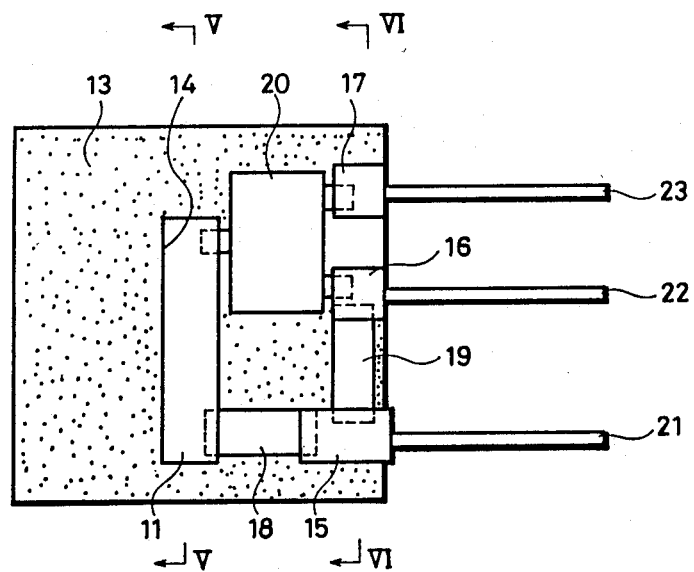
FIG. 4 is a plan view from the direction of the arrow 4 of FIG. 1, with the mold resin removed.
Figure 5:
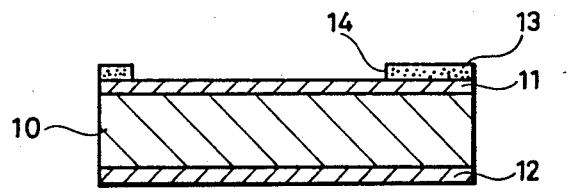
FIG. 5 is a cross sectional view taken along the line V—V of FIG. 4.
Figure 6:
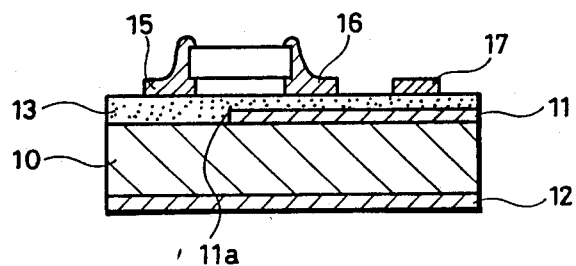
FIG. 6 is a cross sectional view taken along the line VI—VI of FIG. 4.

Referring to FIG. 1, an insulating film 13 is formed almost entirely over the surface of the electrode 11. The insulating film 13 is formed by printing an insulator paste by screen process printing. As shown in FIGS. 4 and 5, a rectangular hole 14 is formed at a central portion of the insulating film 13, with the electrode 11 exposed upward through the hole 14. As shown in FIGS. 4 and 6, three electrodes 15, 16 and 17 are provided on the insulating film 13, spaced apart from each other from left to right, as shown in FIG. 6, on the side toward the notched portion 11a of the electrode 11. As shown in FIG. 1, the electrode 15 extends along the side surface of the pyroelectric device 10 downward to the electrode 12. But because the notched portion 11a is provided in the electrode 11, there is no possibility of short circuit between the electrodes 11 and 15.

As shown in FIG. 4, on the insulating film 13, a chip leak resistance 18 is electrically and physically connected between the electrode 15 and the electrode 11 exposed through the hole 14. Also on the insulating film 13, a chip source resistance 19 is electrically and physically connected between the electrodes 15 and 16. A field effect transistor 20 is also arranged on the insulating film 13. The drain terminal, source terminal and gate terminal of the field effect transistor 20 are electrically and physically connected to the electrodes 17, 16 and 11, respectively. These resistances 18 and 19 and the field effect transistor 20 are respectively connected to the electrodes 11, 15, 16 and 17 by solder.

Outgoing leads 21, 22 and 23 are respectively attached to the electrodes 15, 16 and 17. In addition, the pyroelectric device 10 and the impedance converting circuit formed on the pyroelectric device 10 are covered by molded resin 24, as shown in FIG. 1. Tip portions of the leads 21, 22 and 23 are projecting out of the molded resin 24.

Figure 7:
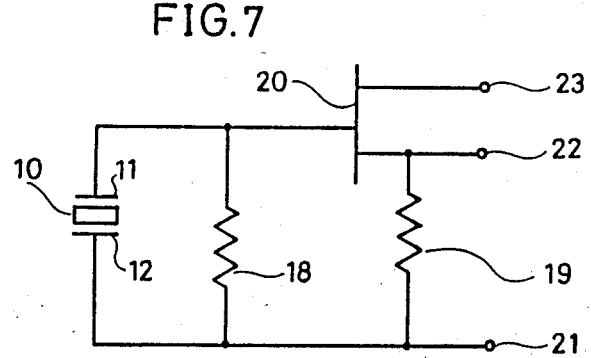
FIG. 7 is an equivalent circuit diagram of one embodiment of the present invention.
Figure 8:
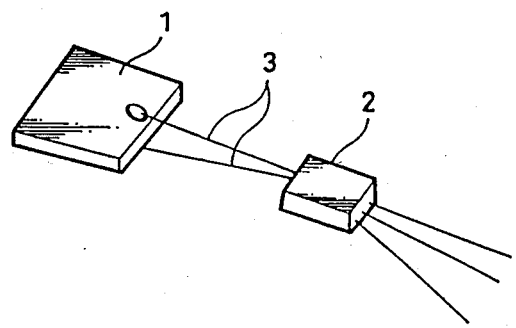
FIG. 8 is an overview of a conventional temperature detector.

An equivalent circuit of the temperature detector of FIGS. 1-6 is shown in FIG. 7. In FIG. 7, portions corresponding to the above described embodiment are denoted by the same reference characters.

The operation of the embodiment will be described in the following.

The pyroelectric device 10 has a spontaneous polarization which changes in accordance with the change of temperature of the object, whereby the change of the temperature (and thus of the spontaneous polarization) appears on the surface of the pyroelectric device as surface charges. With the lead 21 grounded and a constant voltage applied to the lead 23, a gate electrode voltage is applied to the gate of the field effect transistor 20 when a pyroelectric current is generated based on the surface charges on the pyroelectric device 10, whereby an output voltage is provided at the lead 22.

In this embodiment, the impedance converting circuit is unitarily formed on the pyroelectric device 10, and the temperature detector itself including the pyroelectric device 10 and the impedance converting circuit is molded within the molded resin 24, so that the physical strength thereof is very high compared with the conventional structure. Since the resistances 18, 19 and the field effect transistor 20 are physically and electrically connected to respective electrodes 11, 15, 16 and 17 by soldering, the problem in the prior art of disconnection or short circuit of leads between the pyroelectric device and the impedance converting circuit can be eliminated. In addition, measures for preventing moisture problems can be provided to the pyroelectric device and the impedance converting circuit by a single step of molding with the molded resin 24, thereby simplifying the manufacturing process. In addition, since the impedance converting circuit is unitarily attached to the pyroelectric device 10, the whole detector can be made compact.

An operational amplifier may be used for the current-voltage converting circuit, instead of the field effect transistor 20.

As described above, in the temperature detector in accordance with the present invention, the impedance converting circuit is formed on the pyroelectric device, whereby the problem in the prior art of disconnection or short circuit of leads between the pyroelectric device and the impedance converting circuit can be eliminated. In addition, since the impedance converting circuit is provided on the pyroelectric device, the temperature detector as a whole can be made compact.

Although an embodiment of the present invention has been described and illustrated in detail, it is clearly understood that the same is by way of illustration and example only and is not to be taken by way of limitation, the spirit and scope of the present invention being limited only by the terms of the appended claims.

What is claimed is:

1. A temperature detector comprising:
   a pyroelectric device having first and second main electrodes on its first and second main surfaces;
   an insulating thin film formed at least on said first main electrode; and
   an impedance converting circuit including printed circuit elements formed on said insulating film and thereby supported on said pyroelectric device, and connected to said first and second main electrodes.

2. A temperature detector according to claim 1, further comprising:
   a resin coating entirely covering said pyroelectric device, said insulating thin film and said impedance converting circuit.

3. A temperature detector according to claim 1, wherein
   said insulating thin film as a hole through which the first main electrode therebelow is exposed thereby forming an exposed electrode;
   said temperature detector further comprises terminal electrode means formed on said insulating thin film; and
   said impedance converting circuit comprises an impedance converting chip element connected between said terminal electrode means and the exposed electrode.

4. A temperature detector as in claim 3, wherein said impedance converting circuit detects a charge difference between said first and second main electrodes and converts same to an output voltage at said terminal electrode means.

5. A temperature detector as in claim 3, wherein said first main electrode has a notch formed at one edge of said pyroelectric device, said insulating thin film is formed directly on said pyroelectric device at said notch, and the terminal electrode means extends across said notch to interconnect said printed circuit elements to said second main electrode without contacting said first main electrode.

6. A temperature detector as in claim 5, wherein said hole is at a central portion of said first main electrode.

7. A temperature detector as in claim 1, wherein said insulating thin film is formed by screen-printing an insulating paste onto said pyroelectric device.

8. A temperature detector, comprising:
   a flat-shaped pyroelectric device having first and second main electrodes formed on its first and second main surfaces, with a notch formed at an edge of the first main electrode;
   an insulating film formed on said first main electrode and on said pyroelectric device via said notch, by printing and baking an insulating paste, said film having an opening formed to expose a portion of said electrode through said opening; and
   an impedance converting circuit formed on said insulating film; wherein said impedance converting circuit includes:
   a first terminal electrode formed on the insulating film adjacent said notch in said first main electrode and extending across a side surface of said pyroelectric device to the second main electrode without contacting the first main electrode;
   second and third terminal electrodes formed on said insulating film;
   a first resistance connected between said first and second terminal electrodes; a second resistance connected between said first terminal electrode and said exposed portion of said first main electrode; and
   an impedance converting circuit chip connected between said exposed portion of said first main electrode and said second and third terminal electrodes.

* * * * *